(12) United States Patent  
Brid

(10) Patent No.: US 8,209,355 B2
(45) Date of Patent: Jun. 26, 2012

(54) AUTOMATIC USER INTERFACE GENERATION FOR ENTITY INTERACTION

(75) Inventor: Regis Lucien Francis Brid, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 386 days.

(21) Appl. No.: 12/180,563

(22) Filed: Jul. 28, 2008

(65) Prior Publication Data

US 2010/0023547 A1 Jan. 28, 2010

(51) Int. Cl.
*G06F 17/30* (2006.01)
*G06F 3/00* (2006.01)
*G06F 3/14* (2006.01)

(52) U.S. Cl. .......... 707/802; 715/762; 715/864
(58) Field of Classification Search .......... None
See application file for complete search history.

(56) References Cited

U.S. PATENT DOCUMENTS

| | | | |
|---|---|---|---|
| 6,035,300 A | 3/2000 | Cason et al. | |
| 6,738,077 B1 | 5/2004 | Wendker et al. | |
| 7,062,502 B1 | 6/2006 | Kesler | |
| 7,577,912 B2 * | 8/2009 | Govindan et al. | 715/746 |
| 2003/0070061 A1 * | 4/2003 | Wong et al. | 712/220 |
| 2004/0239683 A1 * | 12/2004 | Chu et al. | 345/619 |
| 2005/0015745 A1 * | 1/2005 | Wain et al. | 717/105 |
| 2005/0102308 A1 * | 5/2005 | Sykes et al. | 707/102 |
| 2005/0268234 A1 * | 12/2005 | Rossi et al. | 715/705 |
| 2005/0273763 A1 | 12/2005 | Bendsen et al. | |
| 2006/0036634 A1 | 2/2006 | Kristiansen et al. | |
| 2006/0136832 A1 | 6/2006 | Keller et al. | |
| 2006/0173894 A1 | 8/2006 | Kristoffersen et al. | |
| 2006/0200749 A1 | 9/2006 | Shenfield | |
| 2006/0224992 A1 * | 10/2006 | Rossi et al. | 715/781 |
| 2006/0230379 A1 | 10/2006 | Pintos | |
| 2006/0288301 A1 | 12/2006 | Hood et al. | |
| 2007/0130205 A1 | 6/2007 | Dengler et al. | |
| 2007/0157087 A1 | 7/2007 | Foerg et al. | |
| 2007/0233680 A1 | 10/2007 | Carlson et al. | |

(Continued)

FOREIGN PATENT DOCUMENTS

EP    1571547 A1    9/2005

(Continued)

OTHER PUBLICATIONS

Wong, Candy; Chu, Hao-hua; Katagiri, Masaji, "GUI Migration Across Heterogeneous Java Profiles", 2002, Proc. of the ACM SIGCHI-NZ 2002.*

(Continued)

*Primary Examiner* — Cheryl Lewis
*Assistant Examiner* — Scott A Waldron

(57) ABSTRACT

Architecture that allows a developer to create an application quicker by providing an engine that automatically creates pieces of an application user interface (UI). The engine can take as input an instance of an entity or any entity type, and create as an output a user interface (UI) that allows the application users to view and modify the entity. The architecture also facilitates the association of metadata with the source entity to guide the engine decisions; decisions such as which UI controls the engine chooses to represent the entity properties, how much "real estate" (UI space) the entity is provided, and how the entity properties are to be laid out. Additionally, applications allow the user to interact with known entity types, but also with types that were unknown at the time of the application conception. In other words, applications (e.g., line-of-business) are able to handle random entities that are dynamically generated.

20 Claims, 13 Drawing Sheets

U.S. PATENT DOCUMENTS

2007/0256053 A1 11/2007 Torgerson et al.

FOREIGN PATENT DOCUMENTS

WO WO03102766 A1 12/2003

OTHER PUBLICATIONS

Ding, Yun & Litz, Heiner, "Creating Multiplatform User Interfaces by Annotation and Adaptation", Jan. 29-Feb. 1, 2006, Proc. of the ACM IUI 2006.*

Vanderdonckt & Gillo, "Visual Techniques for Traditional and Multimedia Layouts", ACM Proceedings of the Workshop on Advanced Visual Interfaces, 1994, pp. 95-104.*

Jo Vermeulen et al., "Service-Interaction Descriptions: Augmenting Services with User Interface Models", Engineering Interactive Systems Joint Working Conferences, Mar. 22-24, 2007, pp. 447-464.*

Jan Meskens, "A Graphical Design Tool for Multi-Device User Interfaces Based on UIML", Master Thesis, Hassett University, Nov. 2007, pp. 1-103.*

International Search Report, mailed Feb. 17, 2010, 11 pages.

Monteiro, et al., "GUI Generation Based on Language Extensions, A model to generate GUI, based on Source Code with Custom Attributes", Proceedings of the 10th International Conference on Enterprise Information Systems, Barcelona, Jun. 2008, 449-452.

Damyanov, et al."Metadata driven code generation using .NET framework", International Conference Computer Systems and Technologies—CompSysTech'2004, Proceedings of the 5th international conference on Computer systems and technologies, Rousse, Bulgaria, 2004, pp. 1-6, ACM, New York, NY, USA.

Bajaj, "Inferring the User Interface from an EER Data Schema", AMCIS 2006 Proceedings, 2006.

Vigna, "ERW: Entities and Relationships on the Web", 2002.

Extended European Search Report received for European Patent Application No. 09803375.6, mailed on Aug. 8, 2011, 6 pages.

* cited by examiner

AUTOMATIC USER INTERFACE GENERATION FOR ENTITY INTERACTION

BACKGROUND

Software applications, in general, and line of business (LOB) applications, in particular, represent data objects (also referred to as entities) of various natures. For example, in LOB applications, Customer, Order, Product, and Invoice are examples of entities that need to be created and manipulated. Where applications can be employed for many different deployments, the user interfaces are designed and created for each separate application and for each type of device on which the application is anticipated to be run. Thus, developers have to create specific graphical user interfaces for each of those entity types. This is a time consuming and rather repetitive task. However, applications could be created quicker if entity-specific UIs did not have to be created.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture allows a developer to create an application quicker by providing an engine that automatically creates pieces of the user interface (UI) of the application. The engine can take as input an instance of an entity or any entity type, and create as an output a UI that allows the application users to view and modify the entities. The architecture also facilitates the association of metadata with the source entity to guide the engine decisions; decisions such as which UI controls the engine chooses to represent the entity properties, how much "real estate" (UI space) the entity is provided, and how the UI controls are to be laid out.

Additionally, applications allow the user to interact with known entity types, but also with types that were unknown at the time of the application conception. In other words, applications (e.g., line-of-business) are able to handle random entities that are dynamically generated.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
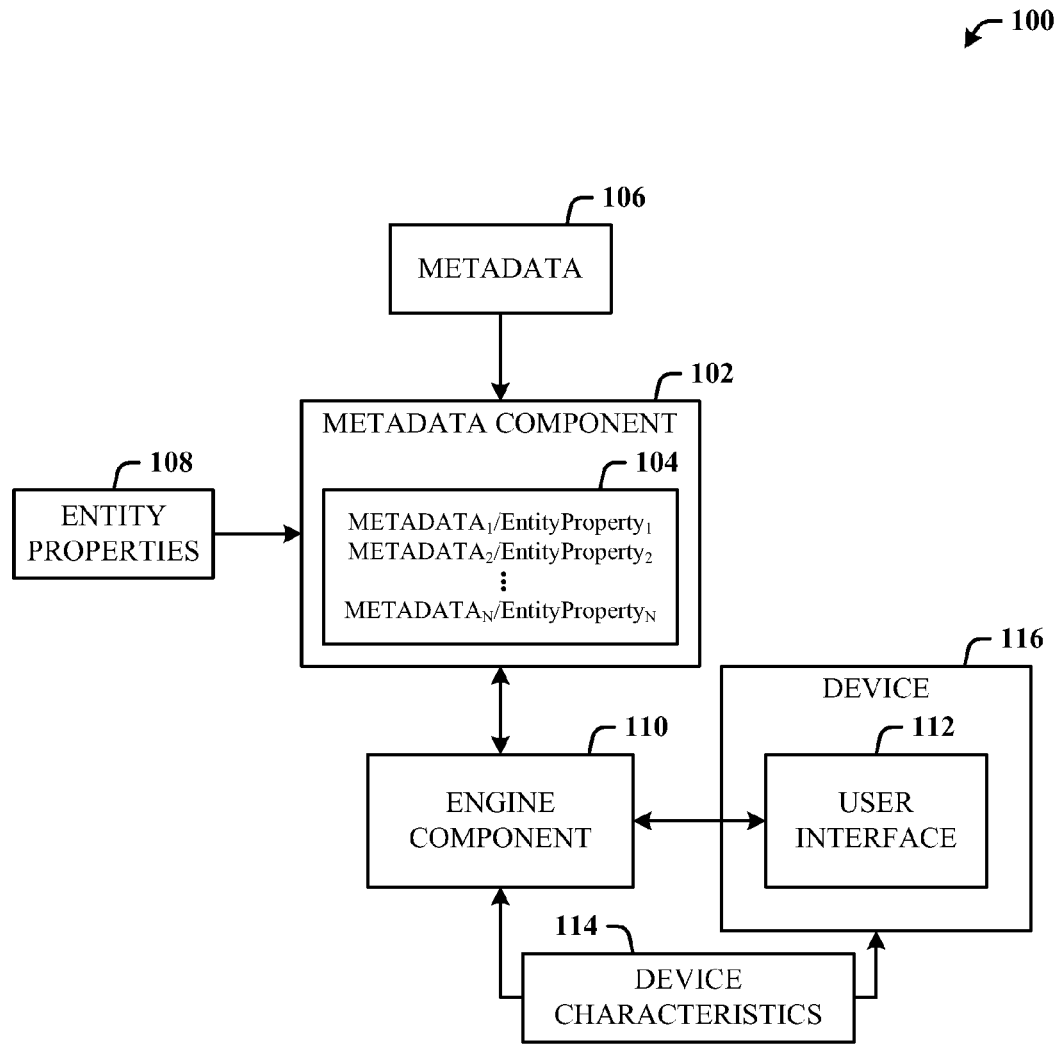
FIG. 1 illustrates a computer-implemented interface generation system in accordance with the disclosed architecture.

Applications such as line of business (LOB) often manipulate entities (objects with properties, such as a Customer object). Accordingly, applications are typically involved in visualizing entities and editing the entities. Oftentimes the entities are stored in databases, shown in a compact representation in a list, or in an expanded representation individually. In most cases, developers need to create a user interface (UI) from scratch to represent the particular entities in a details view.

The disclosed architecture facilitates the automatic creation of application UIs by way of attaching metadata to entities that can guide a UI generator (engine) in order to produce more targeted results. The engine utilizes logic or algorithms to produce meaningful UIs given an entity, the entity metadata and device characteristics such as hardware parameters and software parameters that include allocated real estate for presenting the entities in the UI.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented interface generation system 100 in accordance with the disclosed architecture. The system 100 includes a metadata component 102 for creating an association 104 (denoted Metadata$_1$/EntityProperty$_1$, . . . , Metadata$_N$/EntityProperty$_N$) of metadata 106 with entity properties 108, and an engine component 110 for automatically creating a user interface 112 and presenting the entity properties 108 in the user interface 112 based on the metadata 106.

The engine component 110 can further consider device characteristics 114 of a device 116 in which the user interface 112 is presented. The device characteristics 114 can include hardware capabilities and/or software capabilities of the device 116, such as viewing real estate available on the device 116 for viewing the user interface 112. The engine component 110 facilitates user interaction with the entity properties 108, the interaction includes visualization, editing and/or validation, for example.

The metadata component 102 and engine component 110 can be part of an LOB application. In such an implementation, the metadata component 102 and the engine component 110 facilitate the handling of dynamically generated random entities, which can be business entities.

As is described in greater detail herein, the entities 108 can be presented in the user interface 112 using importance metadata and group metadata, and based on available real estate of a device viewer of the user interface 112. The metadata component 102 includes importance metadata. The importance metadata defines a level of importance (e.g., less importance) associated with an entity property. For example, a less important entity property will be associated with importance metadata that indicates a lower level of importance. The engine component 110 hides the less important entity properties from view in the user interface 112 based on the importance metadata. However, the hidden less important entity properties can be made viewable via a selectable link. When the user selects the link the hidden less important entity property can be viewed.

Some or all of the entity properties 108 are presented in the user interface 112 according to a layout using importance metadata and group metadata, for example, and based on available real estate of a device viewer. The metadata 106 relates to visibility, size, render hints, grouping, importance, and usage, to name a few.

Figure 2:
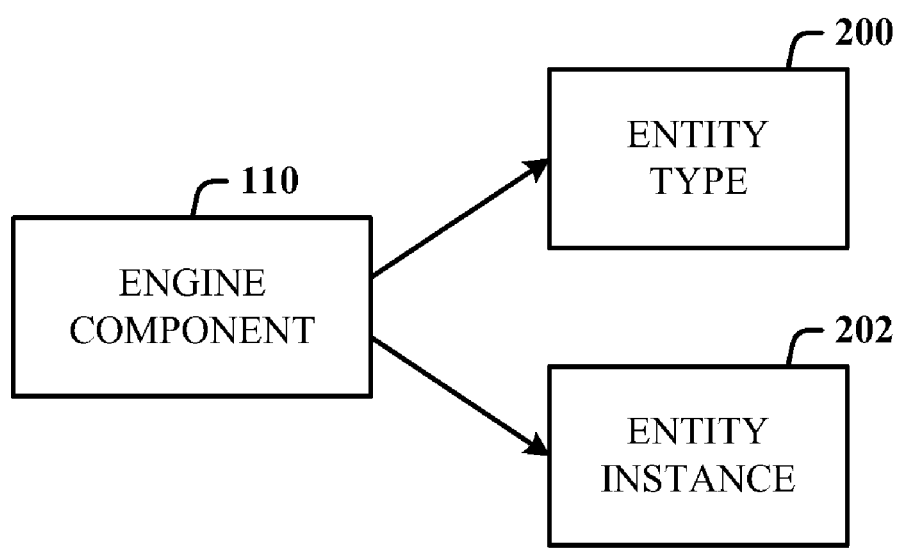
FIG. 2 illustrates entity information exposed by the engine component.

FIG. 2 illustrates entity information exposed by the engine component 110. The engine component 110 can expose an entity type 200 and an entity instance 202 for generating the user interface and populating the user interface with the entity instance. In other words, the engine component 110 exposes the entity type 200 for generation of the user interface, and/or the entity instance 202 for generating the user interface and populating the user interface with the entity instance 202. Following is an example of code for exposing the entity information.

```
public Type EntityViewer.EntityType
public object EntityViewer.Entity
```

Setting the EntityType allows the generation of the UI. Setting the Entity allows not only generation of the UI but also populates the UI with the provided entity.

The engine component 110 determines the potential attributes associated to the various entity properties and builds the UI on-the-fly based on that metadata and built-in mappings (e.g., a string property mapping to a text property editor).

Figure 3:
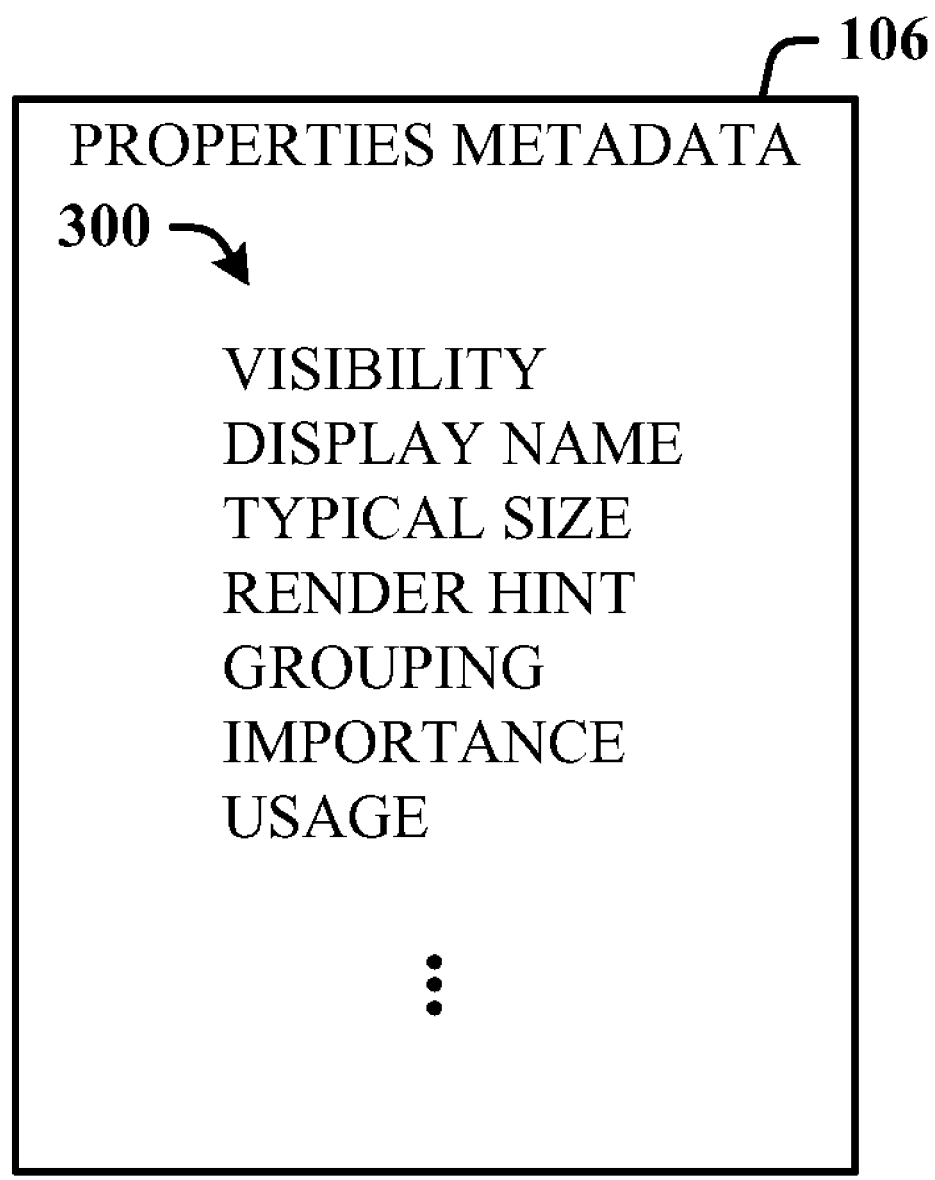
FIG. 3 illustrates examples of property metadata that can be utilized for creating the UI.

FIG. 3 illustrates metadata examples 300 of property metadata 106 that can be utilized for creating the UI. The examples 300 include, but are not limited to, visibility, display name, typical size (e.g., length, width, height, and variations thereof), render hints, groups, importance, and usage, for example.

The examples 300 can be represented in code as the following: UIDescriptionVisible(bool visible), UIDescriptionDisplayName(string displayName), UIDescriptionTypicalSize(uint length, uint variation), UIDescriptionTypicalSize (uint width, uint height, uint widthVariation, uint heightVariation), UIDescriptionRenderHint(string assemblyQualifiedTypeName), UIDescriptionRenderHint(Type type), UIDescriptionGroup(string groupName), UIDescriptionImportanceAttribute(uint importance), and UIDescriptionUsageAttribute(UIDescriptionPropertyUsage propertyUsage).

Other aspects of the disclosed architecture include the following: the readable public properties are eligible for representation in the UI; entity properties are grouped based on UIDescriptionGroup attribute; properties that do not belong to a group (a singleton entity property) and groups of properties are ordered based on UIDescriptionImportance (based on multiple possible sorting algorithms); properties within a group are ordered based on UIDescriptionImportance as well; UI controls are picked based on property type, writability, UIDescriptionRenderHint attribute; UI controls are sized based on UIDescriptionTypicalSize attribute; UI controls re-interpret the received data based on the UIDescriptionUsage attribute (e.g., a string can be re-interpreted as an image URI (uniform resource identifier)); UI controls are laid out based on a layout strategy and available real estate size.

The engine component (also called an entity viewer control) can expose a property called an importance threshold. The threshold can be referred to as a virtual knob that when turned shows more or less fields of the entity. For example, assume the first name is given an importance of seventeen. If the threshold value of the entity control is fifty, for example, then a property that has importance above fifty will be presented in the UI. A property that has importance below fifty will be ignored and not be represented in the UI.

Figure 4:
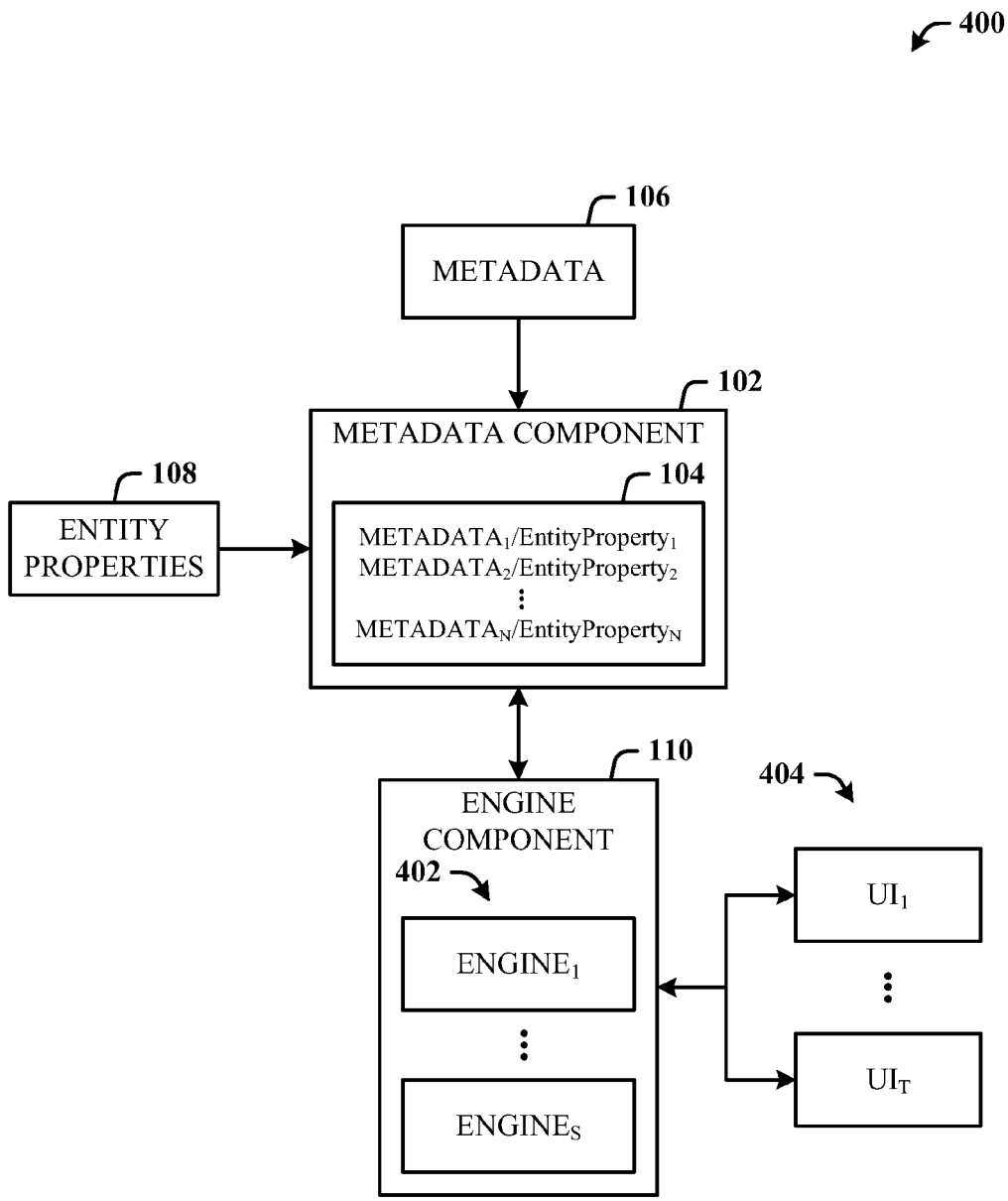
FIG. 4 illustrates a system that employs multiple engines for generating different UIs.

FIG. 4 illustrates a system 400 that employs multiple engines 402 for generating different UIs 404. As before, the metadata component 102 creates the association 104 of metadata/entity properties based on the metadata 106 and the entity properties 108. Here, the engine component 110 includes multiple engines 402 (denoted Engine$_1$, ..., Engine$_S$) for creating UIs (denoted UI$_1$, ..., UI$_T$) based on the device characteristics such as viewable real estate of devices on which the entities (e.g., business objects) will be presented. For example, if the application that is being used is run on a desktop computer, then a different kind of UI is generated than if the application was run on a mobile device. Thus, the use of a different kind of control and a different kind of interaction model, and then attachment of the metadata to the entity enables the user to create applications on-the-fly that target different kinds of device capabilities and device vendors.

Figure 5:
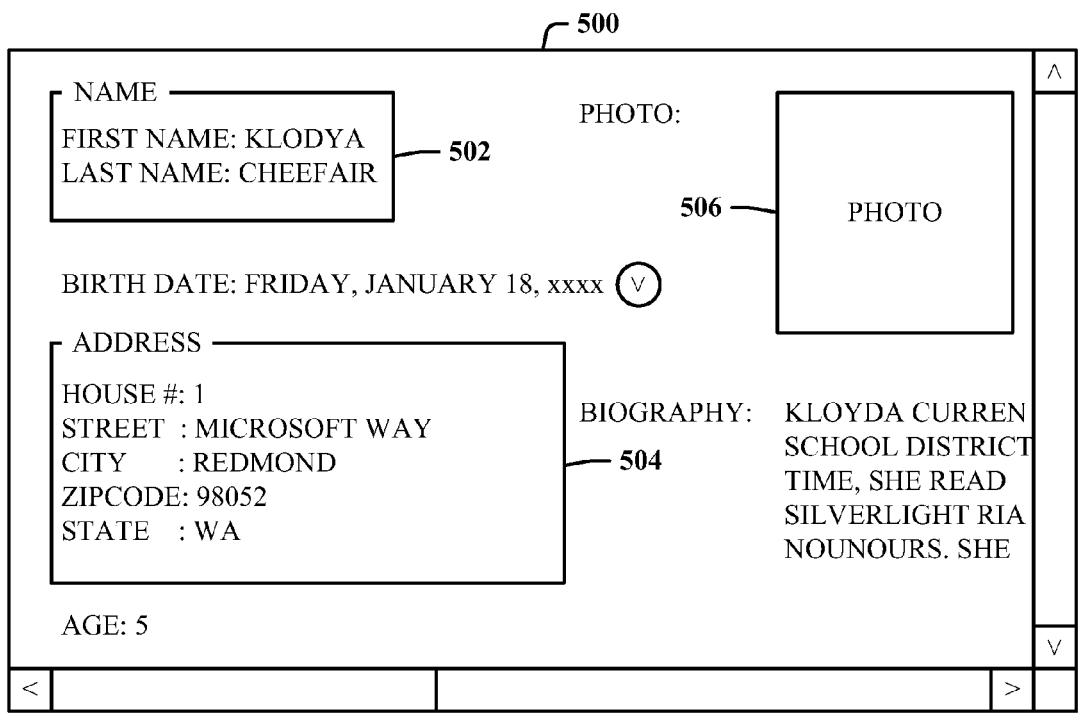
FIG. 5 illustrates an exemplary user interface that can be created on-the-fly using associations of metadata and entities.

FIG. 5 illustrates an exemplary user interface 500 that can be created on-the-fly using associations of metadata and entities. The UI 500 shows a layout and grouping of entity properties. A Name grouping 502 groups the first name and last name. Similarly, an Address grouping 504 groups a House # entity, Street entity, City entity, Zipcode entity and State entity. A photo entity 506 is also presented. The UI 500 is created on-the-fly based on metadata that when processed, indicates that the Name grouping 502, Address grouping 504, photo entity 506, and other entity properties (e.g., birth date, age, biography, etc.) are to be presented according to a layout strategy (e.g., in the top-down order and/or left-right order) shown.

The UI 500 can change in layout and size, for example, depending on the real estate available on the device for which the application (e.g., business) is generating the view. For example, a large text box can be selected and presented on a desktop machine because there is more real estate in the view, whereas a smaller text box would be selected on a PDA or cell phone given the much smaller viewing real estate. However, certain information can be fixed at a minimum and/or a maximum size, such as a last name. For example, the typical size of the last name is ten characters and the associated entity can be constrained to ten characters.

The metadata can be provided as a default set of commonly used entities for the given application and then be supplemented with a custom set of metadata created by the user. For example, a financial application can have the same basic set of metadata related to name and address, but then have additional metadata related to account, interest, etc., that may be different than a business application having the same default set but additional metadata related to product, delivery, and so on.

With respect to group information, a person has a first name and a last name. It is intuitive that when generating the UI 500 for that person that the last name and the first name are proximately placed (e.g., side by side). This means that the first name and the last name can share the same group 502. Thus, metadata is associated with these two properties that indicate the group Name associated to the first name and the last name. The person has an address defined by the group 504 called Address, which can include street number, the street name, the zip code, city name, country, etc.

Importance metadata can be a value range (e.g., a value that ranges from 2-100). The importance metadata of the particular group and the properties put on that group (e.g., the group is placed in the user's space, place group down below, hide the group, etc.) can dictate the viewing location of the group, or if the group will be presented at all. It is intuitive that when creating the UI 500 for a person the first name and the last name will be prominent; thus, the importance metadata of the first name and last name properties will be high. On the other hand, eye color can be a meaningless characteristic of a person; thus, the importance metadata is low relative to the first name.

Accordingly, when generating the UI 500, the entity properties can be laid out top to bottom with high importance properties on top and the lower properties assigned importance metadata in a decreasing range.

Links can be created to less important properties so that the user actually has to select the link to cause presentation of a dialogue box, for example, that shows the less important properties. This is particularly useful when the entity is to be presented on the real estate associated with a PDA or a cell phone, for example. Thus, if the UI was designed for a larger cell phone interface, but was then used on a smaller cell phone interface, the links can be automatically implemented on-the-fly to accommodate the smaller UI. The user can then select the links to access the hidden properties.

For example, consider that the engine received device characteristics indicating that the viewing real estate is 200 pixels for the width and 300 pixels for the height. The engine then creates the appropriate UI for that device. However, when employed on a PDA, the engine can receive device characteristics that the viewing real estate is 50 pixels wide and 60 pixels in height and then creates the appropriate UI. Accordingly, the PDA user will be presented a UI with links such as associated with a wizard type of UI where navigation is from page to page to visualize the different characteristics of the person. In contrast, a desktop user may be given a single form that is sufficient to view all of the characteristics of the person.

In a more robust implementation, device characteristics other than the viewing real estate can be considered, such as CPU, memory, software (e.g., operating system), input devices (e.g., keyboard, a microphone, a mouse, etc.), voice input capability, etc. Additionally, or alternatively, a UI can be created based on user preferences (e.g., the user prefers images on top, followed by name information and no address information) and/or data types (e.g., financial, business).

In another example, the user can interact with a UI to change the UI in such a way that metadata is generated in response to the user interaction. This metadata can then be appended or merged with the existing metadata that is coming with the entity and the engine takes as input not only the metadata provided with the entity but the metadata generated by the end user.

Properties can be associated with access levels based on the UI generated. For example, weight information for a user can be a made read-only property. Alternatively, an address provided such as a street number property can be writeable.

Figure 6:
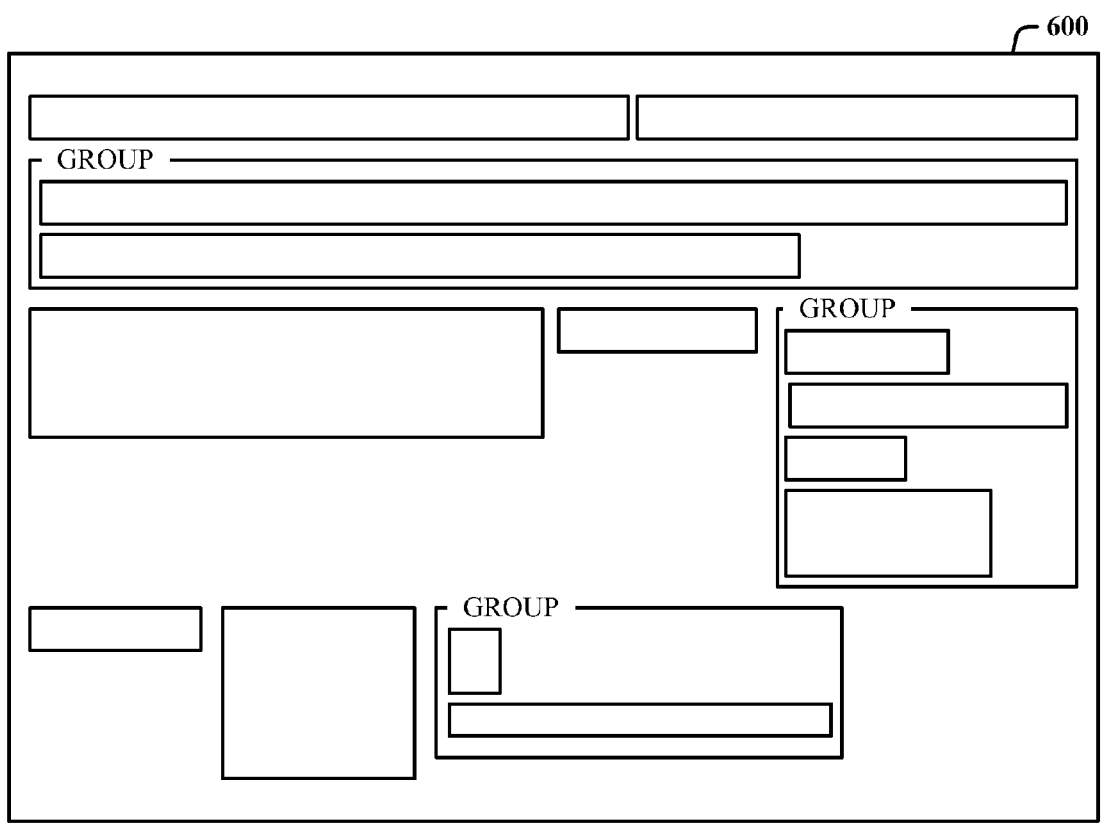
FIG. 6 illustrates a horizontal flow layout of entity properties in an automatically generated UI.
Figure 7:
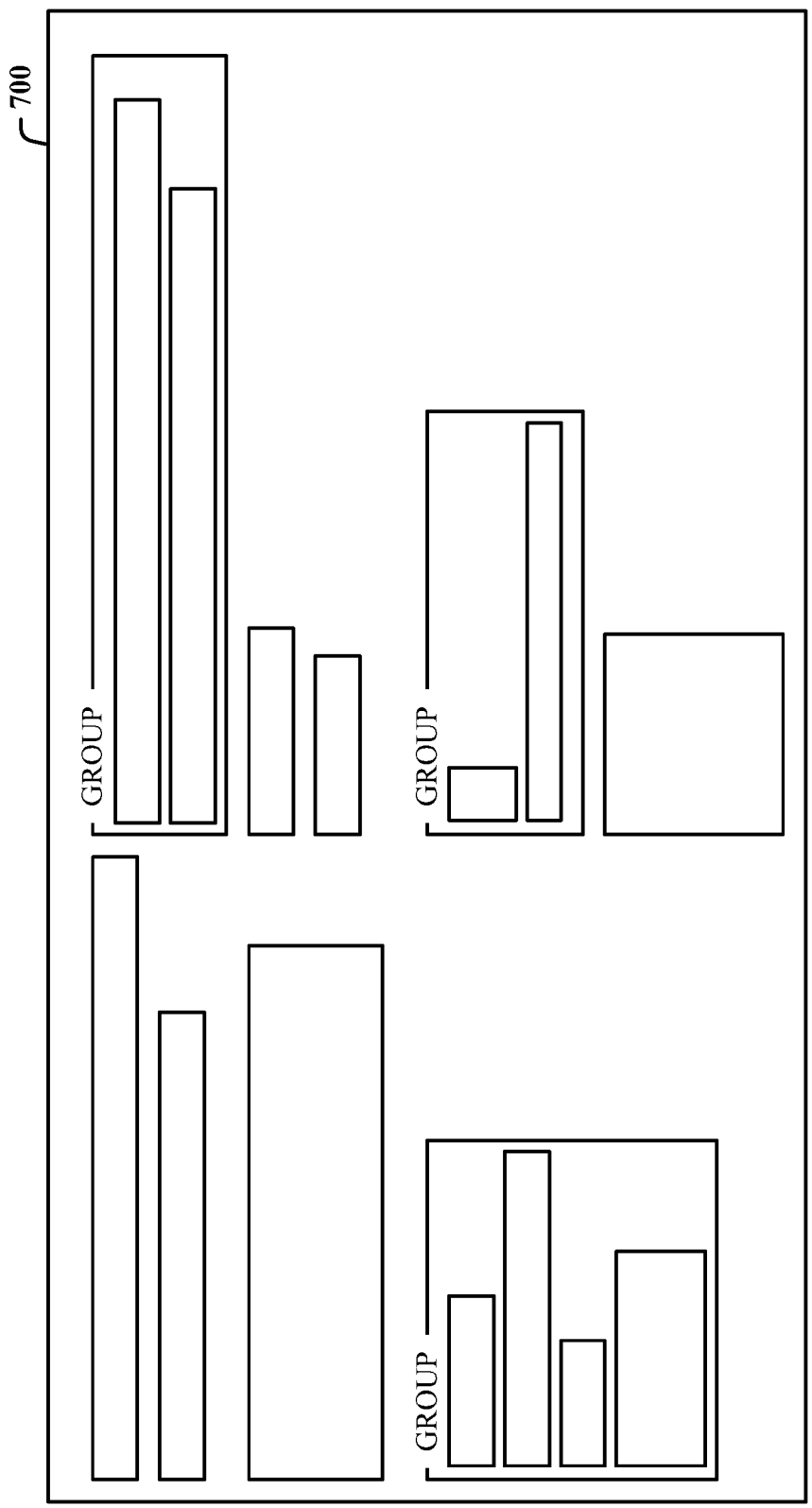
FIG. 7 illustrates a vertical flow layout of entity properties in an automatically generated UI.
Figure 8:
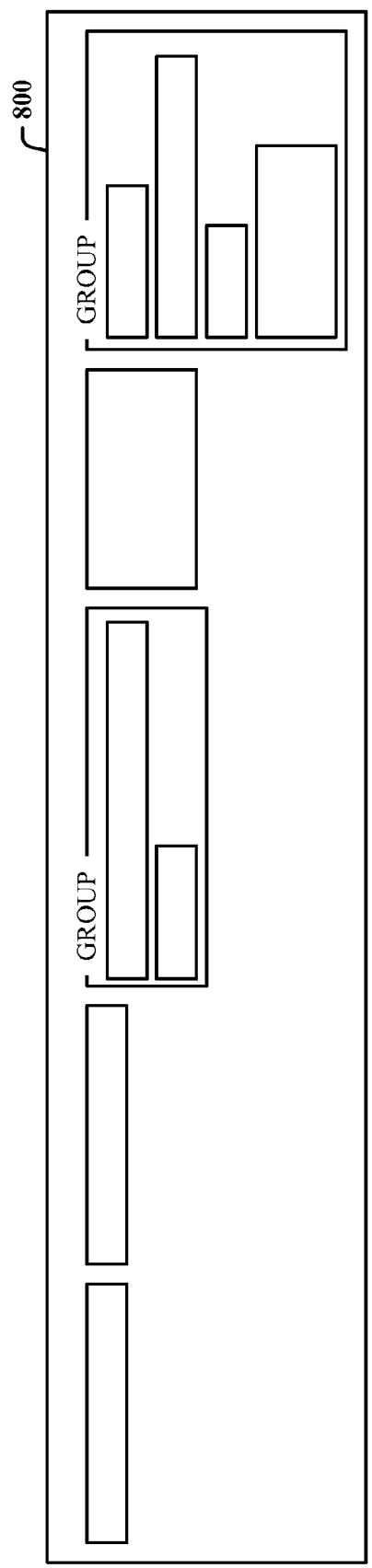
FIG. 8 illustrates a horizontal layout of entity properties in an automatically generated UI.
Figure 9:
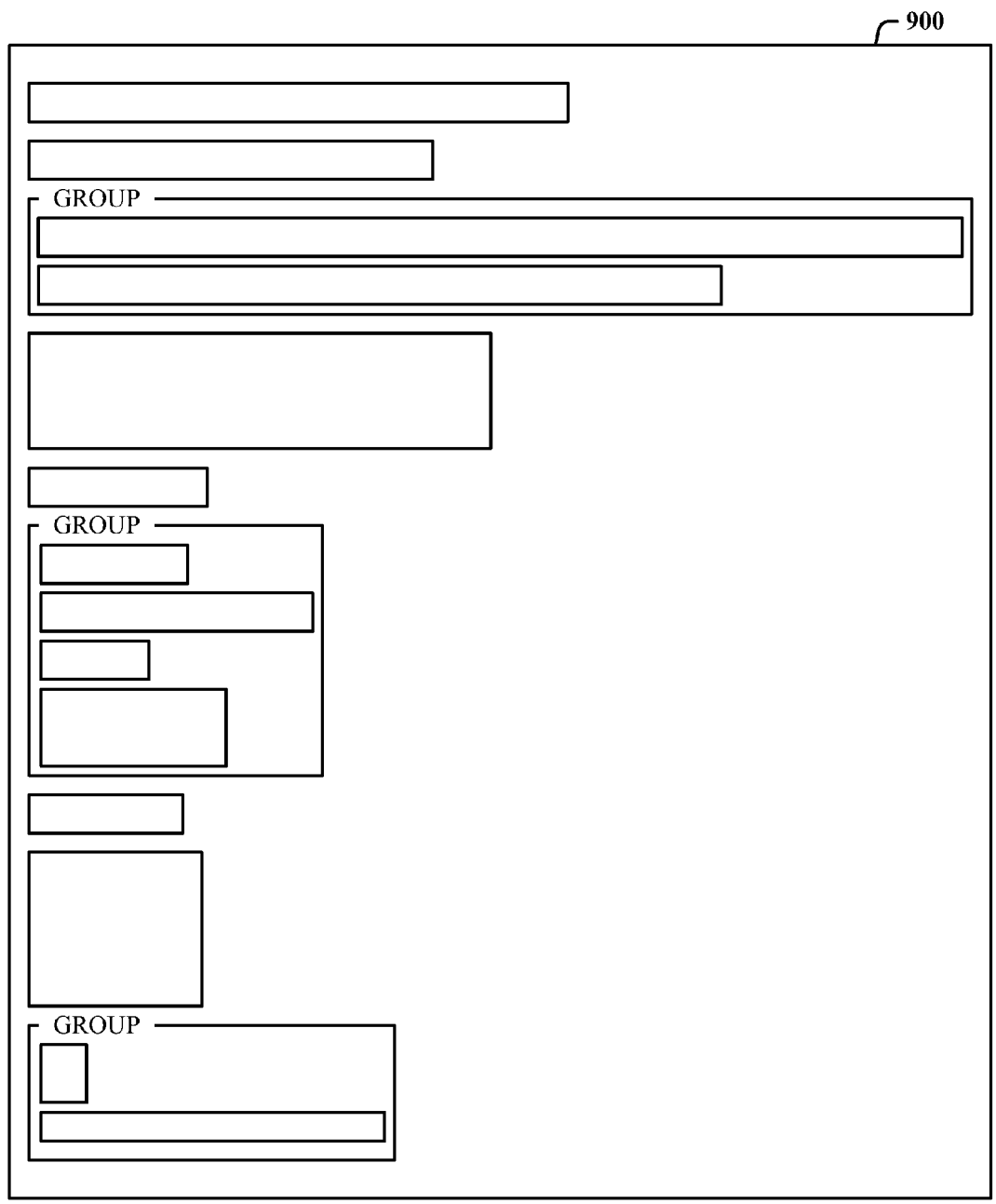
FIG. 9 illustrates a vertical layout of entity properties in an automatically generated UI.

The engine component can select and initiate various layouts of entity orientations in the UI in order to fill out the real estate. Following are four examples, but it is to be understood that other layout can be employed. FIG. 6 illustrates a horizontal flow layout 600. In the flow layout, entity presentation is top-down and left-to-right. FIG. 7 illustrates a vertical flow layout 700. FIG. 8 illustrates a horizontal layout 800. FIG. 9 illustrates a vertical layout 900.

Depending on the purpose of the form being created that represents a particular entity metadata can be added to guide the UI creation in a specific way for the view that is being created. Using an email entity as an example, an email has a sender, a receiver, a date and time the email was sent, the email was received at a certain date and time, and a body. The body of the email typically can be a big piece of information in the form of one or more paragraphs (e.g., text, image, links, etc.). The typical size given to an email body by a developer can be 10,000 characters, for example. When representing an email in a more compact way, it is not desirable to allocate 10,000 characters for the body. A form can be created that represents an email in a more compact representation. For example, for a particular view, the real estate allocated to an email can be reduced such that for a particular view of an email the allocated real estate is now 200 characters. The user can override the default metadata attached to particular fields for particular views.

Following is an exemplary simple class hierarchy that can be employed. The top level EntityViewer class can be as follows:

```
public class EntityViewer : Control, IEntityEditor
```

The engine component can implement public interface IEntityEditor so that the entity can be edited a standard way. Individual property editors can implement public interface IEntityPropertyEditor to standardize the contract between the UI pieces and the top level entity viewer. The TextPropertyEditor is a particular implementation of that interface:

```
public class TextPropertyEditor : Control,
    IEntityPropertyEditor
```

The EntityViewer can use a predefined label for the caption of each property:

```
public class EntityPropertyLabel : Control
```

One example of interface details can include the following.

```
public interface IEntityEditor
{
    bool AllowEdit
```

```
        {
            get;
            set;
        }
        object Entity
        {
            get;
            set;
        }
        Type EntityType
        {
            get;
            set;
        }
        event EventHandler CancelEdit;
        event EventHandler<MemberValueChangedEventArgs>
ValueChanged;
        event EventHandler<MemberValueChangedEventArgs>
ValueChangeCanceled;
    }
    public interface IEntityPropertyEditor
    {
        bool AllowEdit
        {
            get;
            set;
        }
        object Value
        {
            get;
            set;
        }
        Size PreferredSize(uint width, uint height,
                    uint widthVariation, uint
heightVariation);
        event EventHandler<MemberValueChangedEventArgs>
ValueChanged;
        event EventHandler<MemberValueChangedEventArgs>
ValueChangeCanceled;
    }
```

As used in the above code, the EntityViewer is the engine component, and is responsible for creating and populating the UI. The EntityViewer does not initiate, commit, or cancel the editing of the associated entity. It is the responsibility of a collaborating data navigator control, for example, to perform these three tasks. The EntityViewer forwards the property change notifications raised by the individual property controls via the IEntityEditor's ValueChanged and ValueChangedCanceled events. Additionally, the EntityViewer raises its CancelEdit event when the user attempts to cancel the entity editing.

An entity property editor is responsible for representing a single property, and handles the editing experience, if any. A property editor implements IEntityPropertyEditor so that: the EntityViewer can tell if the property should be read-only or read-write; the EntityViewer and property editor have a standard way of exchanging the property value; the property editor has a standard way of notifying the value changes (and cancellations); and, the EntityViewer can figure out a reasonable real estate required to view the property.

Following is one example of a functional walk-through of processes of the disclosed architecture. When the EntityViewer's EntityType property is set (e.g., directly or internally when the Entity property is set), the control can perform the following: the type properties are enumerated and the associated custom attributes are accessed; based on those attributes, the engine creates a set of EntityProperty objects and EntityPropertyGroup objects and populates the objects; the engine raises a RequestVisibility event for each property with a proposed visibility and allows the developer to override the default behavior (note that the visibility depends on the whether the property's importance is below or above an importance threshold value); property controls are then picked based on the property types, the potential render hints, and the RequestPropertyRenderControlType event (note though that properties do not need to be associated to an IEntityPropertyEditor implementation, and the entity viewer can also handle a few stock controls: TextBlock, TextBox, DateTimePicker, and PictureBox); if no rendering hint is provided, the entity viewer picks a PictureBox when the property uses UIDescriptionPropertyUsage.ImageSource and/or a DateTimePicker when the property type is System.DateTime; the preferred sizes for each property control and associated label are determined; from there, the groups' preferred sizes are computed; and, finally the controls representing the groups are created (GroupBox controls).

When it is time for the engine to render itself, the engine first sorts groups according to the property importance and GroupImportanceDefinition property. Then the various group, label and property controls are laid out according to the current layout strategy. When the Entity property is set, the UI is regenerated if the type has changed and the property controls are populated via the IEntityPropertyEditor.Value member.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
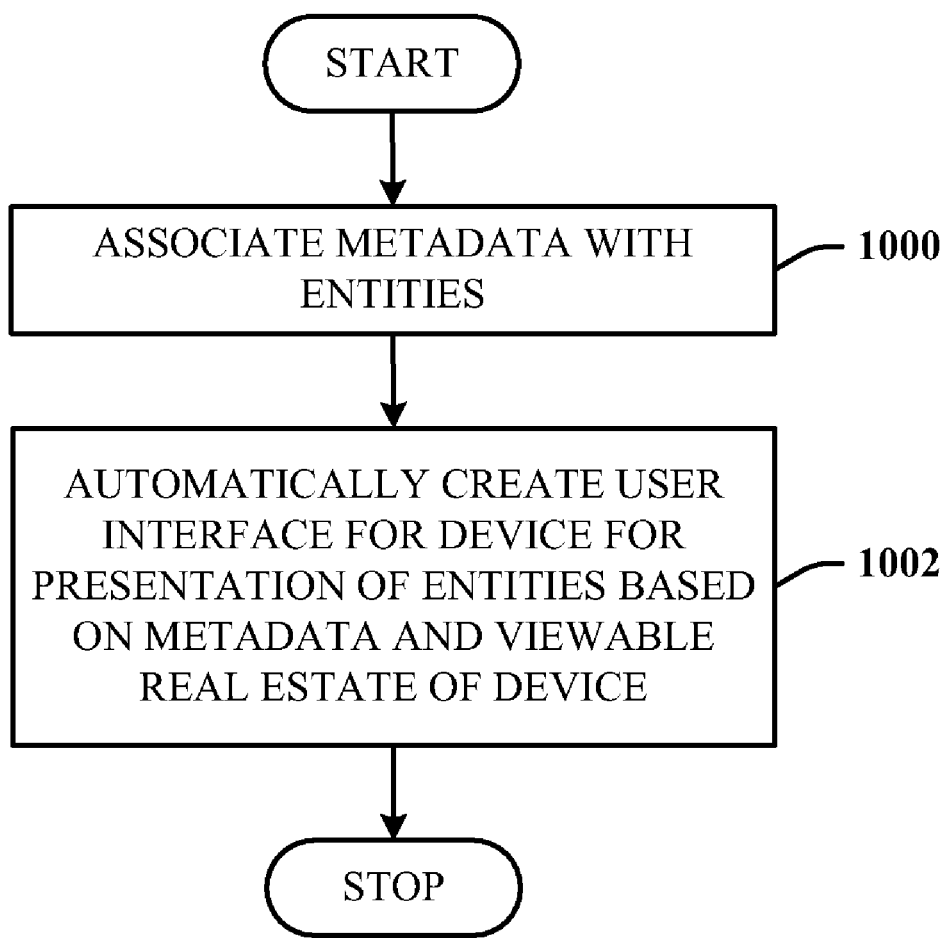
FIG. 10 illustrates a computer-implemented method of generating an interface.

FIG. 10 illustrates a computer-implemented method of generating an interface. At 1000, metadata is associated with entities. At 1002, a user interface is automatically created for a device for presentation of the entities based on the metadata and viewable real estate of the device.

Figure 11:
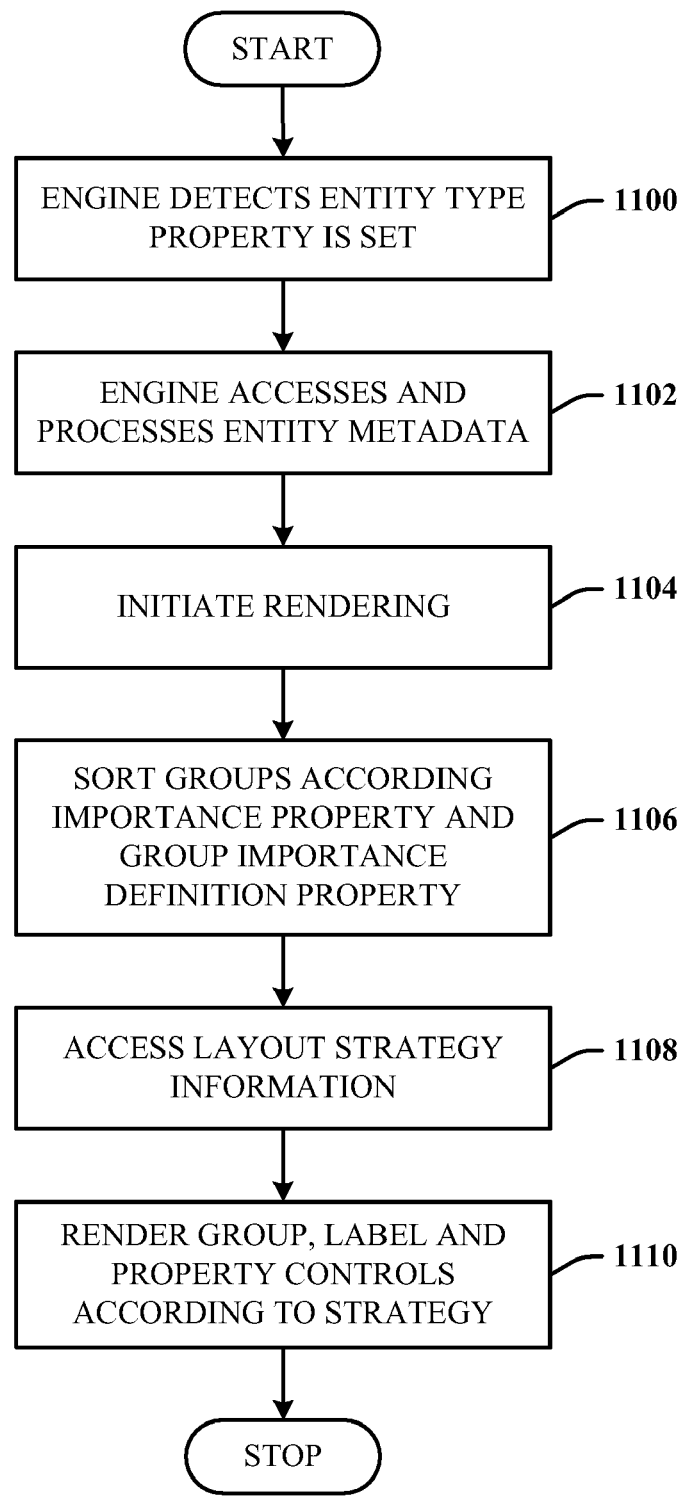
FIG. 11 illustrates a method of applying a layout strategy to the generated user interface.

FIG. 11 illustrates a method of applying a layout strategy to the generated user interface. At 1100, the engine component detects that an entity type property is set. At 1102, the engine component accesses and processes entity metadata. At 1104, rendering is initiated. At 1106, groups are sorted according to an importance property and group importance definition property. At 1108, the layout strategy information is accessed. At 1110, the group is rendered and the property controls are labeled according to the strategy.

Figure 12:
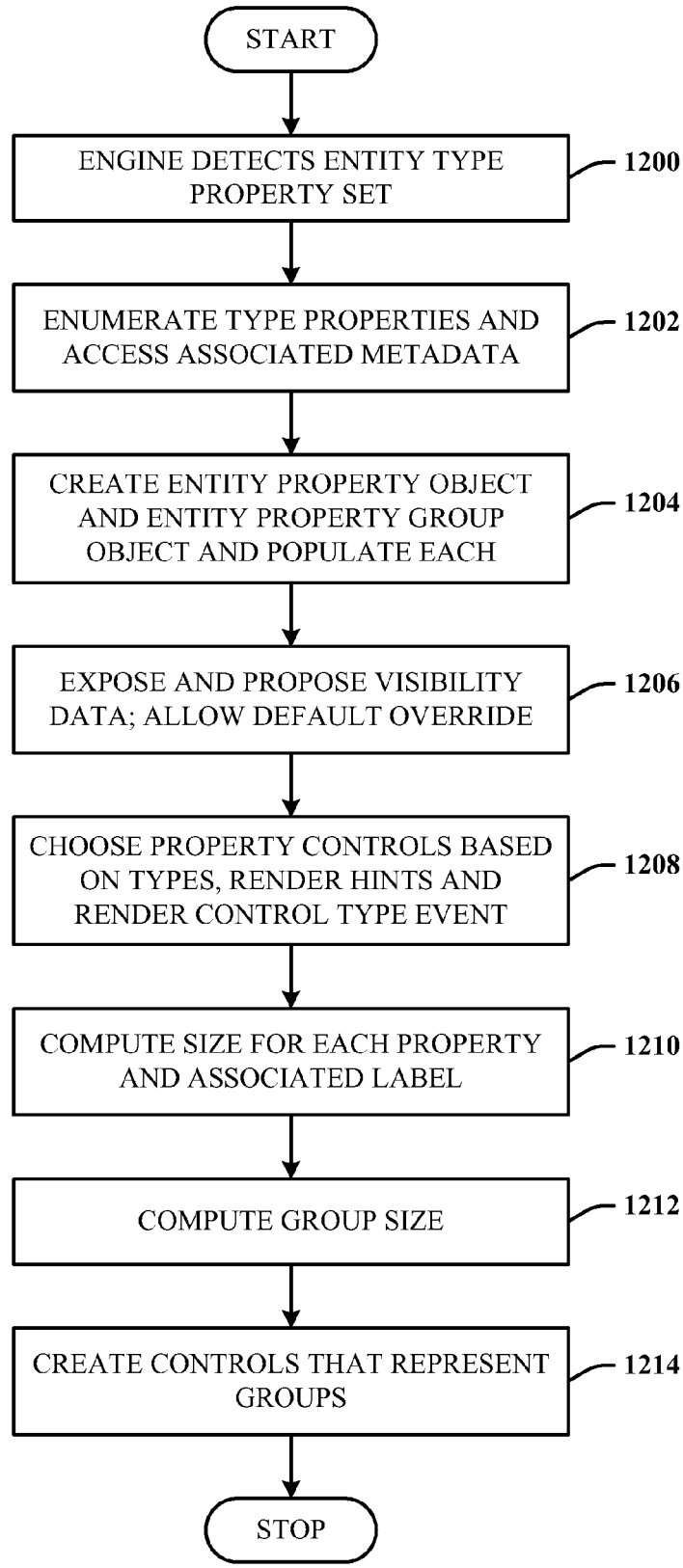
FIG. 12 illustrates a method of processing by the engine when an entity type property is set.

FIG. 12 illustrates a method of processing by the engine when an entity type property is set. At 1200, the engine detects that the entity type property is set. At 1202, the type properties are enumerated and the associated metadata is accessed. At 1204, an entity property object is created and entity property group object is created and each is populated. At 1206, visibility data is exposed and proposed, and default override is allowed. At 1208, property controls are selected based on types, render hints, and render control type event. At 1210, the size for each property and associated label is computed. At 1212, the group size is computed. At 1214, the controls that represent the groups are created.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. An aspect or design described herein as "exemplary" is not necessarily to be construed as preferred or advantageous over other aspects or designs.

Figure 13:
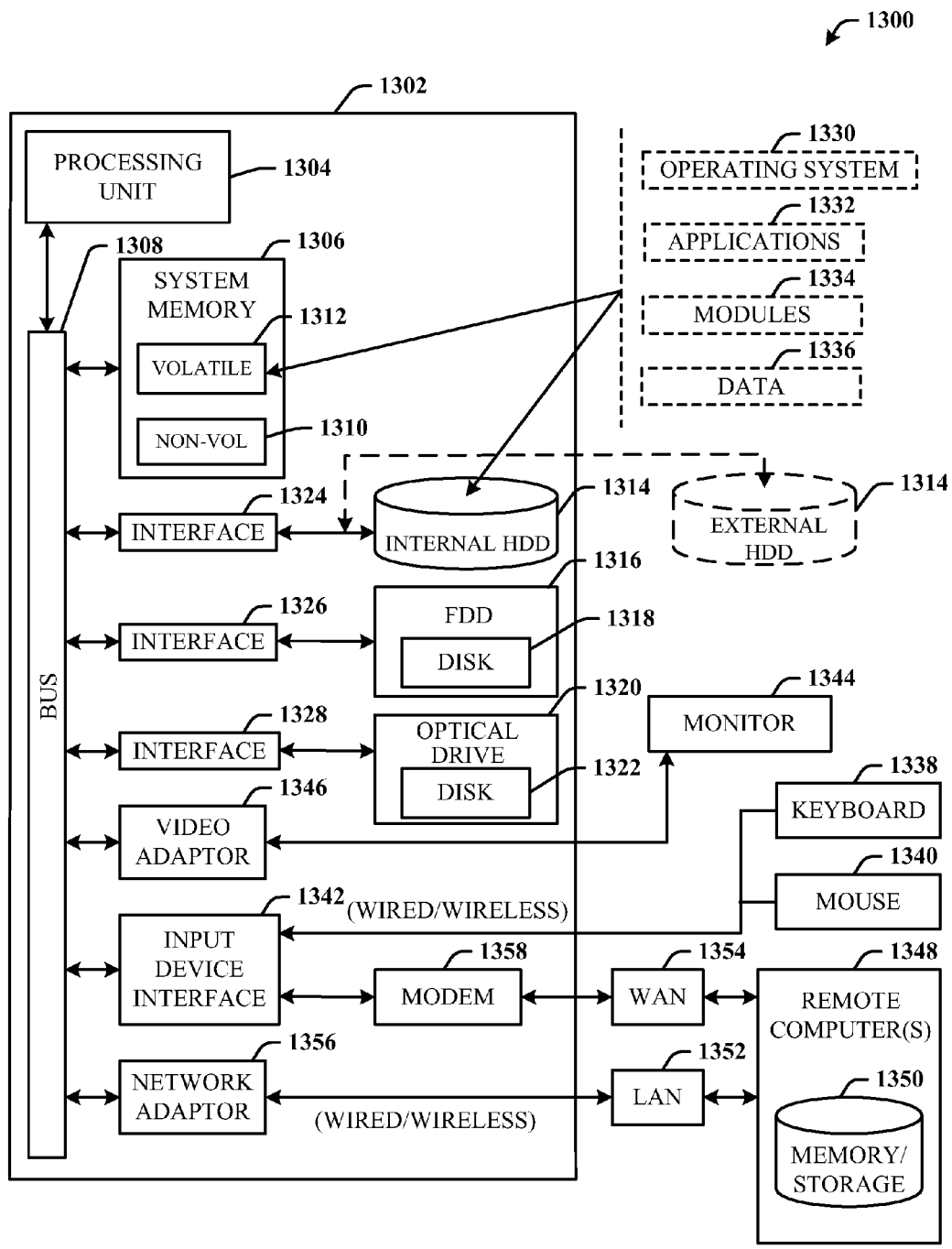
FIG. 13 illustrates a block diagram of a computing system operable to associate metadata with entities and automatically generate a UI in accordance with the disclosed architecture.

Referring now to FIG. 13, there is illustrated a block diagram of a computing system 1300 operable to associate metadata with entities and automatically generate a UI in accordance with the disclosed architecture. In order to provide additional context for various aspects thereof, FIG. 13 and the following discussion are intended to provide a brief, general description of a suitable computing system 1300 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 13, the exemplary computing system 1300 for implementing various aspects includes a computer 1302 having a processing unit 1304, a system memory 1306 and a system bus 1308. The system bus 1308 provides an interface for system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 can include non-volatile memory (NON-VOL) 1310 and/or volatile memory 1312 (e.g., random access memory (RAM)). A basic input/output system (BIOS) can be stored in the non-volatile memory 1310 (e.g., ROM, EPROM, EEPROM, etc.), which BIOS are the basic routines that help to transfer information between elements within the computer 1302, such as during start-up. The volatile memory 1312 can also include a high-speed RAM such as static RAM for caching data.

The computer 1302 further includes an internal hard disk drive (HDD) 1314 (e.g., EIDE, SATA), which internal HDD 1314 may also be configured for external use in a suitable chassis, a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as a DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1312, including an operating system 1330, one or more application programs 1332, other program modules 1334, and program data 1336. The one or more application programs 1332, other program modules 1334, and program data 1336 can include the metadata component 102, the associations 104, the metadata 106, entity properties 108, engine component 110, UI 112, device characteristics 114, entity type 200, entity instance 202, metadata examples 300, engines 402, UIs 404, UI 500, horizontal and vertical flows (600 and 700), horizontal and vertical layouts (800 and 900), and methods of FIGS. 10-12, for example. The device 116 can be the computer 1302, a cell phone, PDA, or other devices that present information.

All or portions of the operating system, applications, modules, and/or data can also be cached in the volatile memory 1312. It is to be appreciated that the disclosed architecture can be implemented with various commercially available operating systems or combinations of operating systems.

A user can enter commands and information into the computer 1302 through one or more wire/wireless input devices, for example, a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, etc.

A monitor 1344 or other type of display device is also connected to the system bus 1308 via an interface, such as a video adaptor 1346. In addition to the monitor 1344, a computer typically includes other peripheral output devices (not shown), such as speakers, printers, etc.

The computer 1302 may operate in a networked environment using logical connections via wire and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, is connected to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented interface generation system, comprising:

a metadata component, at least partially implemented in hardware, for creating an association of metadata with entities and for supplementing the metadata with a custom set of metadata created by a user, the metadata component including importance metadata represented by a value range, the metadata component associating the importance metadata that defines less importance with less important entity properties; and an engine component for
automatically creating a user interface for a device,
presenting the entities in the user interface based on the metadata, the entities being presented in the user interface according to a layout using the importance metadata and group metadata and based on available real estate of a device viewer of the device,
hiding the less important entity properties from view in the user interface based on the importance metadata, and
making the hidden less important entity properties viewable via a selectable link,
the engine component exposing an entity type for generation of the user interface or an entity instance for generating the user interface and populating the user interface with the entity instance, the engine component including a plurality of engines for creating the user interface based on device characteristics of the device,
the metadata component and the engine component configured to facilitate handling of dynamically generated random entities including entity types unknown at a time of conception of an application that is used to create the association of the metadata with the entities.

2. The system of claim 1, wherein the engine component facilitates user interaction with the entities that includes visualization, editing and validation.

3. The system of claim 1, wherein the metadata component and engine component are part of a line-of-business application.

4. The system of claim 1, wherein the metadata relates to visibility, size, render hints, grouping, importance, and usage.

5. The system of claim 1, wherein the device characteristics include one or more of a central processing unit, memory, software, real estate, input device, or voice input capability.

6. The system of claim 1, wherein the engine component further constrains one or more properties of the entities to a minimum size on the user interface.

7. The system of claim 1, wherein the engine component further constrains one or more properties of the entities to a maximum size on the user interface.

8. The system of claim 1, wherein the group metadata dictates a viewing location of a group.

9. The system of claim 1, wherein the group metadata dictates if a group is to be presented on the user interface.

10. A computer-implemented method of generating a user interface, comprising:
   associating metadata with entities, including entity types unknown at a time of conception of an application that is used to associate the metadata with the entities;
   supplementing the metadata with a custom set of metadata created by a user;
   automatically creating the user interface for a device for presentation of the entities based on the metadata and viewable real estate of the device;
   presenting, in the user interface, a plurality of entity properties according to a layout based on importance metadata that is represented by a value range, the importance metadata defining relative importance of the plurality of entity properties, the presenting of the plurality of entity properties comprising
      placing entity properties that are associated with each other in a group, and
      presenting the entity properties of the group in an order according to a layout strategy based on group metadata; and
   exposing an importance threshold, the importance threshold being used to selectively show more or fewer fields of each of the entities such that a property having an importance less than the importance threshold is ignored and not represented in the user interface.

11. The method of claim 10, further comprising reinterpreting data passed to an entity based on usage metadata.

12. The method of claim 10, further comprising selecting a layout of the entities based on one or more of a central processing unit, memory, software, viewable real estate, input device, voice input capability, or user preferences.

13. The method of claim 10, further comprising facilitating user interaction with the entities including visualization, editing, and validation.

14. The method of claim 10, wherein the entities are business entities in a line-of-business application.

15. The method of claim 10, wherein the metadata relates to visibility, size, render hints, grouping, importance, and usage.

16. The method of claim 10, wherein the group metadata dictates a viewing location of the group.

17. The method of claim 10, wherein the group metadata dictates if the group is to be presented on the user interface.

18. A computer program product comprising a computer-readable storage device having computer program logic recorded thereon for enabling a processor-based system to generate an interface, the computer program logic comprising:
   first programmable logic module for enabling the processor-based system to create an association of metadata with entities and for supplementing the metadata with a custom set of metadata created by a user, the metadata component including importance metadata represented by a value range, the metadata component associating the importance metadata that defines less importance with less important entity properties; and
   second programmable logic module for enabling the processor-based system to
      automatically create a user interface for a device,
      present the entities in the user interface according to a layout using the metadata, importance metadata, and group metadata and based on available real estate of a device viewer of the device,
      hide the less important entity properties from view in the user interface based on the importance metadata,
      make the hidden less important entity properties viewable via a selectable link, and
      expose an entity type for generation of the user interface or an entity instance for generating the user interface and populate the user interface with the entity instance, the second programmable logic module including a plurality of programmable logic modules for enabling the processor-based system to create the user interface based on device characteristics of the device,
   the first programmable logic module and the second programmable logic module configured to enable the processor-based system to facilitate handling of dynamically generated random entities including entity types unknown at a time of conception of an application that is used to create the association of metadata with the entities.

19. The computer program product of claim 18, wherein the first programmable logic module and second programmable logic module are part of a line-of-business application.

20. The computer program product of claim 18, wherein the metadata relates to visibility, size, render hints, grouping, importance, and usage.

* * * * *